United States Patent

[11] 3,630,260

[72] Inventor Carl Harold Bailey
Bergland, Mich.
[21] Appl. No. 26,612
[22] Filed Apr. 8, 1970
[45] Patented Dec. 28, 1971
[73] Assignee Copper Range Company
New York, N.Y.

[54] TIRE CHANGER
9 Claims, 7 Drawing Figs.
[52] U.S. Cl. .................................................... 157/1.26,
157/1.33
[51] Int. Cl. .................................................... B60c 25/06
[50] Field of Search .......................................... 157/1, 1.1,
1.17, 1.2, 1.26, 1.33

[56] References Cited
UNITED STATES PATENTS
2,704,570  3/1955  Reeves ........................ 157/1.2
2,840,143  6/1958  Skiles .......................... 157/1.26
3,033,268  5/1962  Schaevitz ..................... 157/1.26

Primary Examiner—Granville Y. Custer, Jr.
Attorney—Morse, Altman & Oates

ABSTRACT: In a tire mounting and demounting apparatus, a carriage is slidably mounted to an enclosure adapted for reception of an upright tire assembly. A plurality of individually actuatable rams are mounted to the enclosure and carriage, particular rams being adapted for positioning of the carriage within the enclosure and other rams being adapted for selective engagement and disengagement of the tire assembly. In the demounting of a wheel from a tire, the positioning rams are actuated individually until the engagement rams and the wheel is in spaced relation. Thereafter, the engagement rams are actuated selectively for engagement and disengagement with the wheel, in consequence the adhesive bond between the wheel and tire is broken and removal of the wheel from the tire is facilitated.

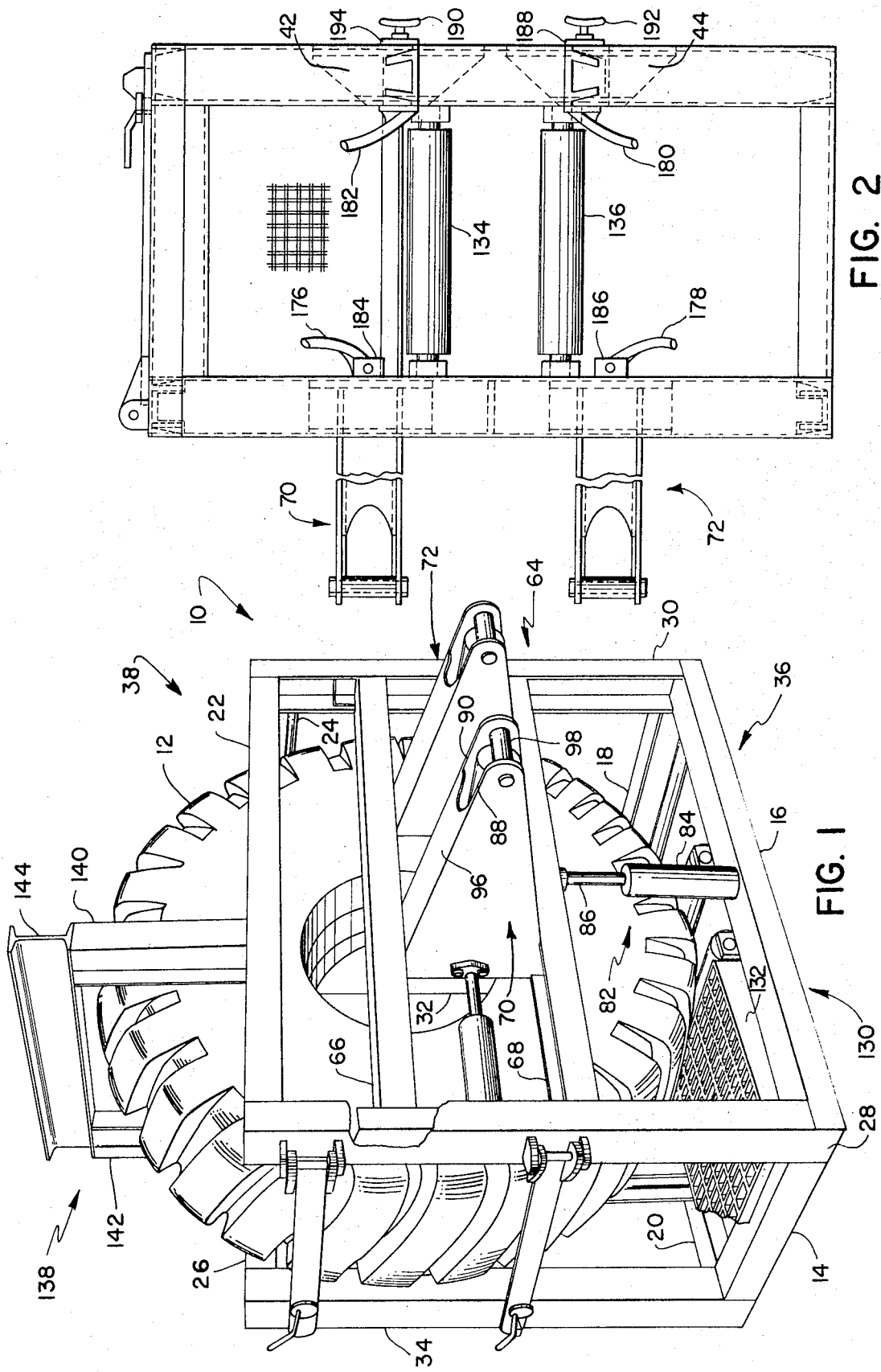

INVENTOR
CARL H. BAILEY
BY Morse, Altman & Oates
ATTORNEYS

TIRE CHANGER

BACKGROUND OF THE INVENTION

1. Field of Invention

The present invention relates to tire changers and more particularly to an apparatus adapted to facilitate the mounting and demounting of a wheel.

2. Description of the Prior Art

In the handling of heavy duty tires, such as those employed on trucks and earth movers, much difficulty has been experienced due to the "freezing" of the tire to the wheel upon which it is mounted. Such "freezing" is the adhesion of the tire to the wheel which frequently takes place due to various physical and chemical reactions between the rubber of the tire and the metal of the wheel, such as a tendency through the heat generated in the tire for it to vulcanize itself to the wheel at its point of contact and also through the rusting of the wheel in the vicinity of the tire. Such adhesion of the tire or "freezing" necessitates the hammering and other abusive treatments which are apt to injure the tire carcass, as well as the side walls of the tire with the result that in some instances tires have been rendered practically useless through the abuse required in order to separate the tire from the wheel.

SUMMARY OF THE INVENTION

An object of the present invention is to provide an apparatus for facilitating the mounting and demounting of a wheel without causing injury to either the tire or the wheel. The apparatus is characterized by a frame formed by a plurality of interconnecting members defining a substantially rectangular structure adapted for reception of an upright tire assembly. A vertically slidably carriage is mounted to the frame. A first ram is affixed to the frame and is drivingly connected to the carriage for controlling the spaced relation of the carriage and the tire assembly. A first housing and a second housing are slidably received within the carriage, each of the housings being capable of independent lateral movement. A second ram is affixed to the frame and is drivingly connected to the first housing for controlling lateral travel of the first housing and a third ram is affixed to the frame and is drivingly connected to the second housing for controlling lateral travel of the second housing. A fourth ram is affixed to the first housing and a fifth ram is affixed to the second housing, the fourth and fifth rams being adapted for independent engagement and disengagement of the wheel. In the demounting of a wheel from a tire, the fourth and fifth rams are positioned in spatial relationship with the wheel by selective manipulation of the first, second and third rams. Thereafter, the fourth and fifth rams are actuated selectively for engagement and disengagement with the wheel, in consequence the adhesive bond between the wheel and tire is broken and removal of the wheel from the tire is facilitated.

The invention accordingly comprises the apparatus possessing the construction, combination of elements, and arrangement of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description, taken in connection with the accompanying drawings, wherein:

FIG. 1 is a perspective of the tire mounting and demounting apparatus embodying the features of this invention;

FIG. 2 is a top plan of the apparatus of FIG. 1;

DETAILED DESCRIPTION OF THE PREFERRED EMBODIMENT

Figure 3:
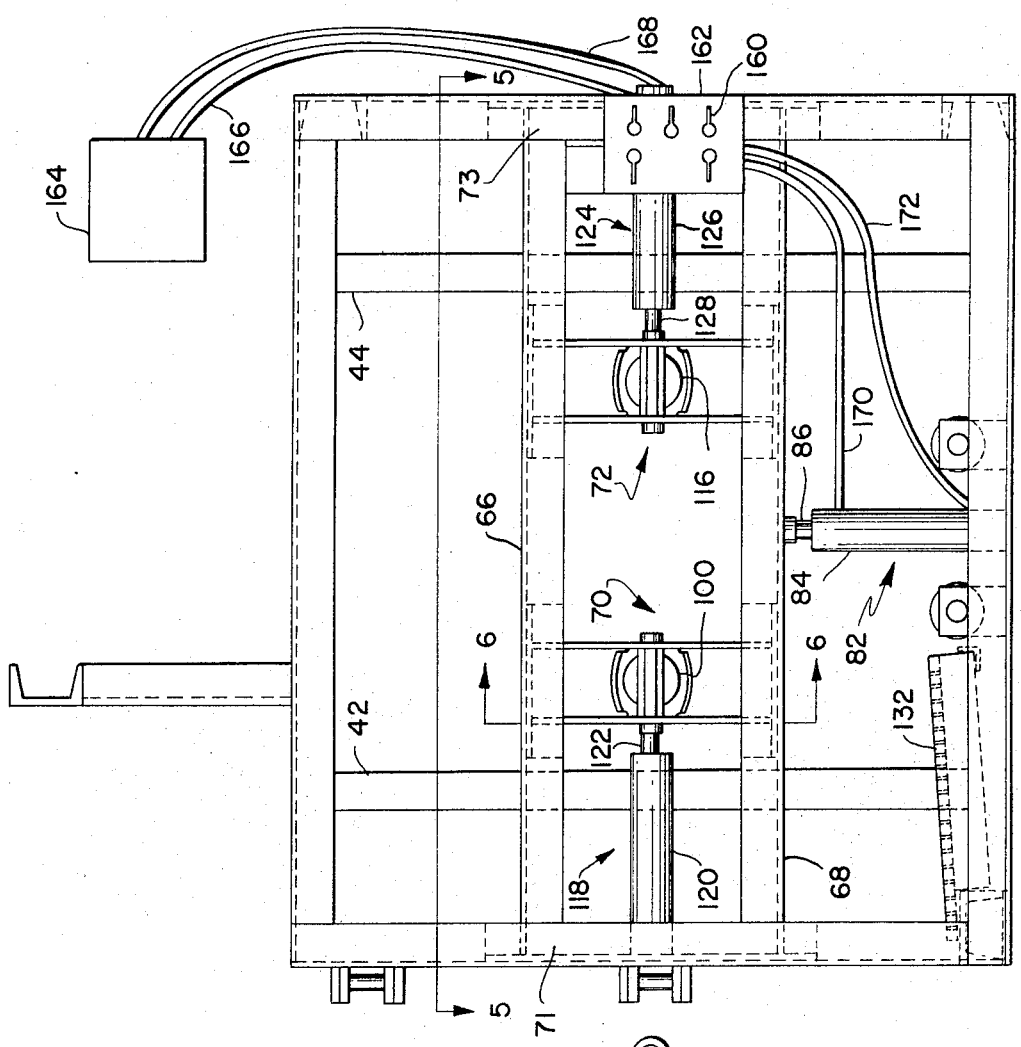
FIG. 3 is a front elevation of the apparatus of FIG. 1.

Referring to the drawings in detail, the tire changing apparatus is organized about an enclosure 10 which is adapted for reception of a tire 12 in the upright position. In the preferred embodiment illustrated in FIG. 1, enclosure 10 is an open framed boxlike structure which is comprised of horizontal members 14, 16, 18, 20, 22, 24, 26 and vertical members 28, 30, 32, 34. Horizontal members 14, 16, 18 and 20 are connected together to form a substantially rectangular base 36 and horizontal members 22, 24, and 26 are connected together to form a substantially U-shaped top 38. Opposite extremities of each vertical member 28, 30, 32 and 34 are connected respectively to base 36 and top 38, in consequence top 38 is supported in spaced relation to base 36. Interconnected members 16, 22, 28, 30 and interconnected members 20, 26, 32, 34 define the forward and rearward walls, respectively, of enclosure 10. The right and left sides of enclosure 10 are defined by interconnected members 18, 24, 30, 32 and interconnected members 14, 28, 34, respectively.

Enclosure 10 is provided with braces 40, 42 and 44. The opposite extremities of brace 40 are connected respectively to vertical members 30 and 32. In the illustrated embodiment, horizontal members 20 and 26 are channel bars adapted for frictionally receiving opposite extremities of each brace 42 and 44.

Figure 4:
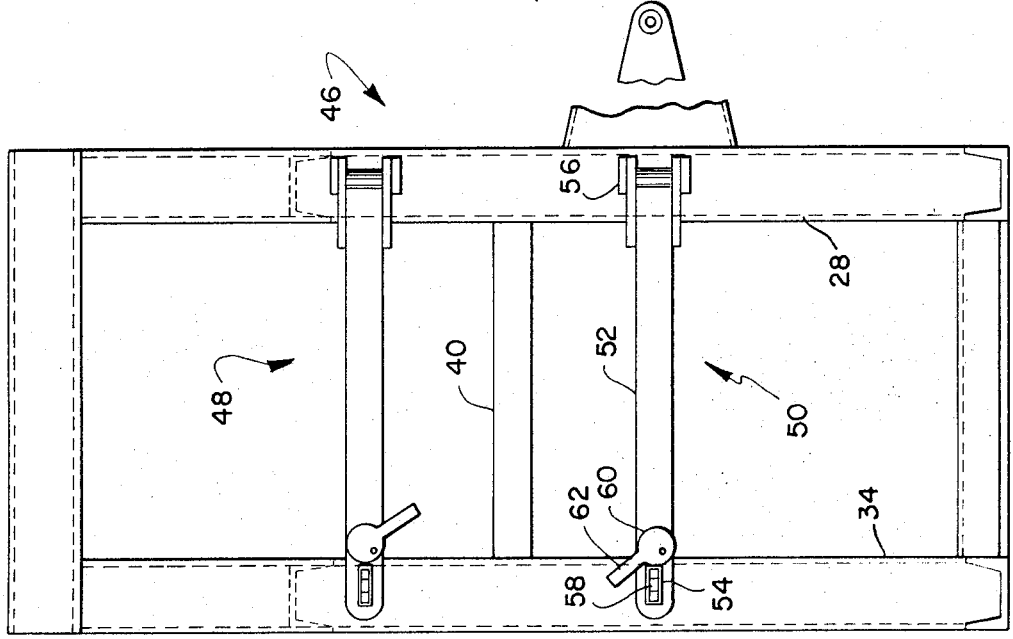
FIG. 4 is a side elevation of the apparatus of FIG. 1.

As best shown in FIG. 4, the left or open side of enclosure 10 is provided with a gate 46 having like sections 48 and 50. Each gate section includes a bar 52 formed with an opening 54 substantially at one end thereof. The other end of bar 52 is connected to vertical member 28 by a hinge 56. Vertical member 34 is provided with a boss 58 which is slidably received within opening 54. A cam 60 having a handle 62 is pivotably connected to bar 52 in proximity with opening 56 for frictional engagement and disengagement with boss 58.

Figure 5:
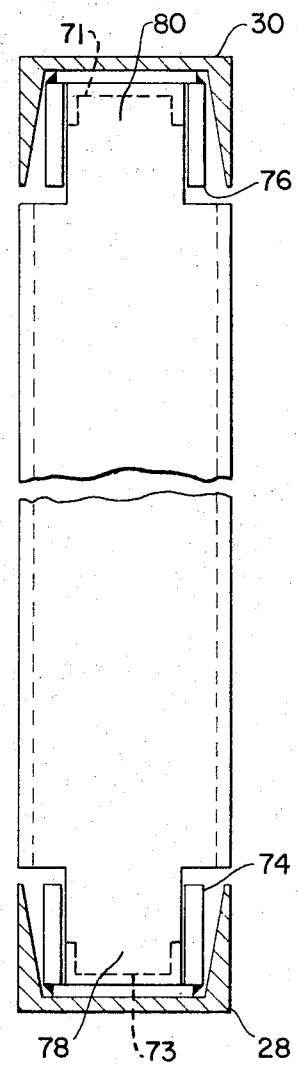
FIG. 5 is an enlarged sectional view taken along the lines 5—5 of FIG. 3.

Again referring to FIG. 1, it will be seen that vertical members 28 and 30 are channel bars and a carriage 64 is slidably mounted therein. Carriage 64 includes horizontal members 66 and 68 which are held in parallel spatial relationship by vertical members 71 and 73, opposite ends of each vertical member 71 and 73 are connected respectively to horizontal members 66 and 68. As best shown in FIG. 5, vertically extending U-shaped brackets 74 and 76 are secured to vertical members 28 and 30, respectively, each bracket defining a guideway. The opposite extremities of each horizontal member 66 and 68 are cutaway to form guides 78 and 80 which are slidably received within guideways 74 and 76, respectively. A ram 82, for example a hydraulic actuator comprised of a cylinder 84 having a reciprocating piston 86 mounted therein, is affixed to horizontal member 16 and drivingly connected to horizontal member 68. That is, cylinder 84 is secured to horizontal member 16 and piston 86 is secured to horizontal member 68. It will be readily appreciated that the vertical position of carriage 64 with relation to the forward side of enclosure 10 is controlled by ram 82. A pair of housings 70 and 72 are slidably mounted to carriage 64.

Figure 6:
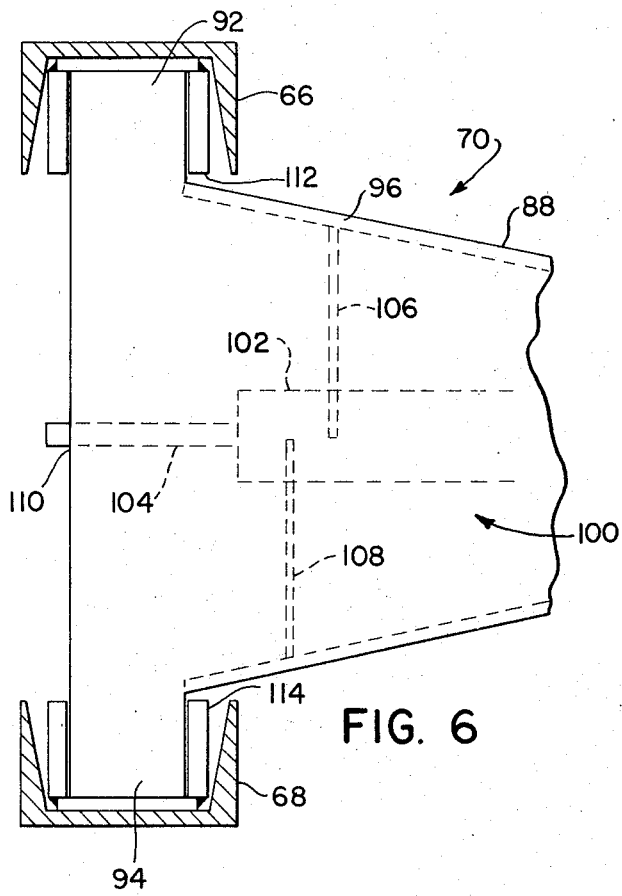
FIG. 6 is an enlarged sectional view taken along the line 6—6 of FIG. 3.

As best shown in FIG. 6, housing 70 is comprised of a pair of substantially triangular shaped sides 88 and 90. Each side 88 and 90 is formed with extensions 92 and 94 at opposite ends of its base. Side 88 is held in spaced relation to side 90 by a member 96 which is cutaway at the apex portion of the triangular housing. Opposite ends of a pin 98 are connected respectively to sides 88 and 90 in proximity to their apex. A ram 100, for example a hydraulic actuator comprised of a cylinder 102 having a reciprocating piston 104 mounted therein, is affixed within housing 70. A pair of inwardly extending partitions 106 and 108 are affixed to member 96 for securing cylinder 102 within housing 70. The rearward wall of cylinder 102 bears against pin 98. Member 96 is formed with an opening 110 which is adapted for slidable reception of piston 104.

In the illustrated embodiment, horizontal members 66 and 68 are channel bars having horizontally extending U-shaped brackets 112 and 114 respectively secured therein, each bracket defining a guideway. Extensions 92 and 94 are slidably received within guideways 112 and 114, respectively, in consequence housing 70 is laterally slidable within carriage 64. Housing 72, having a ram 116 mounted therein is similar to housing 70.

As best shown in FIG. 3, a ram 118, for example a hydraulic actuator comprised of a cylinder 120 having a reciprocating piston 122 mounted therein, is affixed to vertical member 71 and drivingly connected to housing 70. That is, cylinder 120 is mounted to vertical member 71 and piston 122 is attached to housing 70. A ram 124, for example a hydraulic actuator comprised of a cylinder 126 having a reciprocating piston 128 mounted therein, is affixed to vertical member 73 and drivingly connected to housing 72. That is, cylinder 126 is mounted to vertical member 73 and piston 128 is attached to housing 72. It will be readily appreciated that the lateral position of housings 70 and 72 within carriage 64 is controlled by rams 118 and 124, respectively.

Now referring to FIGS 1 and 2, it will be seen that tire 12 is supported on a platform 130 which is comprised of a support 132 and rollers 134, 136. Support 132, for example a grating, is mounted to horizontal members 14, 16, and 20 at a slight incline toward the left side of enclosure 10. Opposite ends of each roller 134 and 136 are attached respectively to horizontal 16 and 20. The spatial relationship among grating 132, roller 134 and roller 136 is such that tire 12 is rolled into enclosure 10 via grating 132 and rotatably supported on rollers 132 and 134. A substantially channel shaped structure 138 is attached to the top of enclosure 10 substantially midway between the left and right sides. Structure 138 is comprised of a pair of uprights 140, 142 and a horizontal member 144. One end of each upright 140 and 142 is secured to horizontal members 22 and 26 respectively, and the other end of horizontal member 144. A positioning device (not shown), for example an overhead hoist, is attached to horizontal member 144 for facilitating positioning of tire 12 in enclosure 10.

Figure 7:
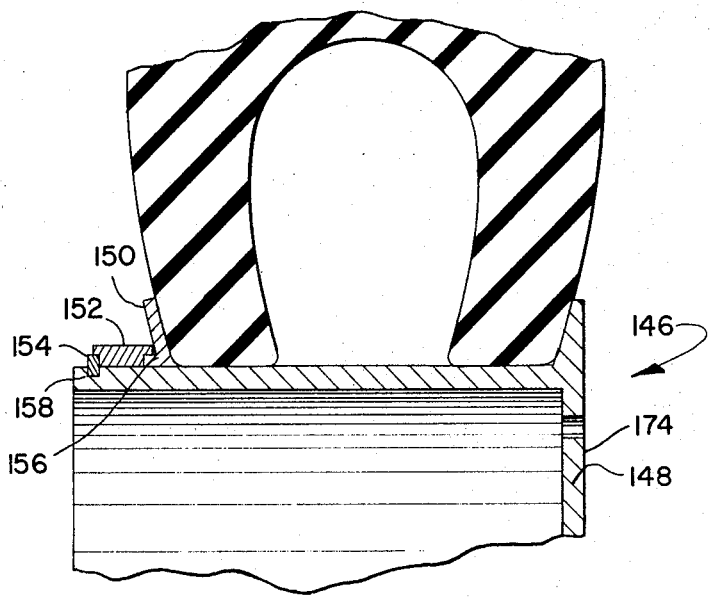
FIG. 7 is a sectional view of a tire assembly.

Prior to describing the operation of the apparatus, it may be well to briefly describe a typical tire assembly. Generally, the tire assembly shown in FIG. 7 comprises a wheel 146 which includes a rim 148, a flange ring 150, a bead seat band 152 and a split locking ring 154. The cross section of bead seat band 152 is substantially T-shaped adapted for reception of a shoulder 156 of flange ring 150 and locking ring 154. Rim 148 is formed with an annular channel 158 which is adapted for reception of locking ring 154.

In the following illustrative example of the operation of the tire changing apparatus, it is assumed that wheel 146 is to be removed from tire 12. Tire 12 is first placed on rollers 134 and 136 by either rolling the tire onto grating 132 or lifting the tire by means of the overhead hoist or a combination thereof, it being understood that gate 46 is opened. Tire 12 is positioned in enclosure 10 in the upright position with flange ring 150 facing housings 70 and 72. Gate 46 is closed and secured to vertical member 34 by the frictional engagement of cam 60 and boss 58. A plurality of handles 160, operatively connected to a control 162 which is connected to a hydraulic reservoir 164 via lines 166 and 168, are provided for actuation of rams 82, 100, 116, 118, and 124. Each handle 160 is operatively connected to each ram 82, 100, 116, 118 and 124, i.e., one handle controls only one ram. The hydraulic connection between control 162 and ram 82 is shown in FIG. 3. When handle 160 is rotated in a clockwise direction, power is applied to ram 82 via a line 170 whereby piston 86 is retracted into cylinder 84 and when handle 160 is rotated in a counterclockwise direction, power is applied to ram 82 via a line 170 whereby piston 86 is extended out of cylinder 84. It is to be understood that each ram 100, 116, 118 and 124 are controlled in a similar manner.

Ram 82 is actuated selectively until carriage 64 is position about the center of rim 148. Rams 118 and 124 are manipulated by movement of correlative handles 160 until rams 100 and 116, respectively, are in spaced relation to flange ring 150. Thereafter, rams 116 and 118 are actuated selectively and flange ring 150 is pushed toward tire 12, in consequence locking ring 154 is disengaged from bead seat band 152. Locking ring 154 is extracted from annular channel 158 and bead seat band 152 and flange ring 150 are removed from rim 148.

After Rams 100 and 116 are released, rams 118 and 124 are manipulated again by moment of correlative handles 160 until rams 100 and 116, respectively, are in spaced relation to a forward wall 174 of rim 148. Rams 100 and 116 are actuated selectively in such a manner that rim 148 is removed from tire 12.

The tire changing apparatus is provided also with a plurality of tire spreading hooks 176, 178, 180 and 182 for facilitating the insertion of inner tubes and protective tube flaps. Spreading hooks 176 and 178 are mounted to brackets 184 and 186, respectively. Brackets 184 and 186 are adapted for interconnection with rams 100 and 116, respectively. Spreading hooks 180 and 182 are mounted to channel brackets 188 and 194, respectively. Brackets 188 and 194 are adapted for slidable engagement of vertical members 44 and 42, respectively. Locking devices 190 and 192 are operatively connected to brackets 188 and 194 for securing each bracket to its correlative vertical member.

Since certain changes may be made in the foregoing disclosure without departing from the scope of the invention herein involved, it is intended that all matter contained in the above description and depicted in the accompanying drawings be construed in an illustrative and not in a limiting sense.

I claim:

1. An apparatus for mounting and demounting a wheel on a tire in the upright position comprising:
   a. a frame formed with an entrance adapted for reception of a tire;
   b. a platform mounted to said frame for supporting said tire;
   c. a carriage mounted to said frame;
   d. means operatively connected to said frame and carriage for controlling the spatial relationship of said tire and carriage;
   e. at least two rams operatively affixed to said carriage;
   f. at least two housings slidably mounted to said carriage;
   g. means operatively connected to each of said rams for controlling the spatial relationship of each of said rams and said wheel; and
   h. means connected to each of said rams for selectively actuating each of said rams into engagement and disengagements with said wheel.

2. The apparatus as claimed in claim 1 including at least two additional rams, each of said additional rams connected to said frame and one of each of said housings.

3. An apparatus for mounting and demounting a wheel on a tire in the upright position comprising:
   a. a frame formed with an entrance adapted for reception of a tire;
   b. at least two tire supporting members rotatably mounted to said frame;
   c. a carriage slidably mounted to said frame, said carriage slidable in a vertical direction;
   d. means operatively connected to said frame and carriage for controlling the spatial relationship of said tire and carriage;
   e. a first housing slidably mounted to said carriage, said first housing slidable in a horizontal direction;
   f. a second housing slidably mounted to said carriage, said second housing slidably in a horizontal direction;
   g. means operatively connected to said carriage and first and second housings for controlling the spatial relationship of said wheel and said first and second housings;
   h. a first ram mounted within said first housing and adapted for engagement and disengagement with said wheel;

i. a second ram mounted within said second housing and adapted for engagement and disengagement with said wheel; and j. means operatively connected to said first and second rams for selectively actuating each of said rams into engagement and disengagement with said wheel.

4. The apparatus as claimed in claim 3 wherein said first and second rams are hydraulic actuators.

5. The apparatus as claimed in claim 3 including a gate hinged to said frame about said entrance, said tire captively held within said frame when said gate is closed.

6. The apparatus as claimed in claim 3 wherein said means for controlling the spatial relationship of said wheel and first and second housing includes:

a. a third ram affixed to said carriage and drivingly connected to said first housing; and b. a fourth ram affixed to said carriage and drivingly connected to said second housing.

7. The apparatus as claimed in claim 6 wherein said means for controlling the spatial relationship of said tire and carriage is a fifth ram operatively connected to said frame and carriage.

8. The apparatus as claimed in claim 7 wherein said first housing and second housing are horizontally slidable within said carriage.

9. An apparatus for mounting and demounting a wheel comprising:

a. a frame formed with an entrance adapted for reception of a tire;

b. a gate hinged to said frame about said entrance, said tire captively held within said frame when said gate is closed;

c. at least two tire supporting members rotatably mounted to said frame;

d. a carriage slidably mounted to said frame, said carriage slidable in a vertical direction;

e. a first ram affixed to said frame and drivingly connected to said carriage;

f. a first housing slidably mounted to said carriage, said housing slidable in a horizontal direction;

g. a second housing slidably mounted to said carriage, said second housing slidable in a horizontal direction;

h. a second ram affixed to said carriage and drivingly connected to said first housing;

i. a third ram affixed to said carriage and drivingly connected to said second housing;

j. a fourth ram mounted within said first housing, said fourth ram adapted for engagement and disengagement with said wheel;

k. a fifth ram mounted within said second housing, said fifth ram adapted for engagement and disengagement with said wheel; and l. means for actuating said first, second, third, fourth and fifth rams.

* * * * *